United States Patent
Balani et al.

(10) Patent No.: US 8,468,391 B2
(45) Date of Patent: Jun. 18, 2013

(54) UTILIZING LOG EVENT ONTOLOGY TO DELIVER USER ROLE SPECIFIC SOLUTIONS FOR PROBLEM DETERMINATION

(75) Inventors: Naveen G. Balani, Mumbai (IN); Ramkishor Singh, Mumbai (IN)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 12/849,944

(22) Filed: Aug. 4, 2010

(65) Prior Publication Data

US 2012/0036397 A1 Feb. 9, 2012

(51) Int. Cl.
*G06F 11/00* (2006.01)

(52) U.S. Cl.
USPC .......................................... 714/37; 714/38.11

(58) Field of Classification Search
USPC .......................................................... 714/37
See application file for complete search history.

(56) References Cited

U.S. PATENT DOCUMENTS

| | | | | |
|---|---|---|---|---|
| 7,240,330 | B2 * | 7/2007 | Fairweather | 717/116 |
| 7,620,715 | B2 * | 11/2009 | DiFalco et al. | 709/224 |
| 7,827,447 | B2 * | 11/2010 | Eberbach et al. | 714/45 |
| 8,073,731 | B1 * | 12/2011 | Rajasenan | 705/7.42 |
| 2002/0184402 | A1 | 12/2002 | Gangopadhyay | 709/315 |
| 2004/0059966 | A1 * | 3/2004 | Chan et al. | 714/48 |
| 2006/0059032 | A1 * | 3/2006 | Wong et al. | 705/10 |
| 2006/0259813 | A1 * | 11/2006 | Ushijima | 714/6 |
| 2007/0005740 | A1 * | 1/2007 | DiFalco et al. | 709/223 |
| 2007/0038683 | A1 * | 2/2007 | Dixon et al. | 707/202 |
| 2007/0094256 | A1 * | 4/2007 | Hite et al. | 707/6 |
| 2007/0112714 | A1 * | 5/2007 | Fairweather | 706/46 |
| 2007/0288419 | A1 * | 12/2007 | Strassner | 706/55 |
| 2008/0243848 | A1 * | 10/2008 | Vedula | 707/8 |
| 2009/0113247 | A1 * | 4/2009 | Gofuku et al. | 714/37 |
| 2009/0210745 | A1 * | 8/2009 | Becker et al. | 714/26 |
| 2010/0042632 | A1 * | 2/2010 | Johnson et al. | 707/100 |
| 2010/0138698 | A1 * | 6/2010 | Angele et al. | 714/37 |
| 2010/0241698 | A1 * | 9/2010 | Hillerbrand | 709/203 |
| 2011/0022560 | A1 * | 1/2011 | Breiter et al. | 706/47 |
| 2011/0082716 | A1 * | 4/2011 | Bhamidipaty et al. | 705/7.11 |
| 2011/0295790 | A1 * | 12/2011 | Zillner | 706/55 |
| 2012/0054675 | A1 * | 3/2012 | Rajamannar et al. | 715/809 |
| 2012/0096316 | A1 * | 4/2012 | Suit | 714/37 |

OTHER PUBLICATIONS

Dancy, E., "Problem Determination With TPTPs Log Analyzer," IBM Corporation, Mar. 6, 2007, EclipseCon 2007, [retrieved Aug. 4, 2010] retrieved from the Internet: < http://www.eclipse.org/tptp/home/documents/conferences/eclipseCon2007/Problem_Determination_With_TPTP_s_Log_Analyzer_revised.ppt>.

* cited by examiner

*Primary Examiner* — Kamini Patel
(74) *Attorney, Agent, or Firm* — Patent on Demand P.A.; Brian K. Buchheit; Scott M. Garrett (57) ABSTRACT

A log event can be received from a log source within an application server environment. The log event can be an error message which is associated with a log level. In one embodiment, the application server environment can be a JAVA 2 ENTERPRISE EDITION runtime environment. The log event can be analyzed to determine the ontology of the log event which can comprise of the log event, the user context, and the relationship of the log event to the user context. The log event can be associated with the user context as determined by the relationship of the log event.

20 Claims, 5 Drawing Sheets

| | | |
|---|---|---|
| LogAnalyzer | supports | Component |
| Component | hasName | String |
| Component | hasCode | ErrorCode |
| ErrorCode | hasCode | String |
| ErrorCode | hasDescription | String |
| ErrorCode | hasResolution | String |
| ErrorCode | hasParent | Component |

420

Component1  type      Component
Component1  hasName   DB2
ErrorCode1  type      ErrorCode
ErrorCode1  hasCode   "SQLSTATE=57011"
ErrorCode1  hasDescription "Transaction log size full"
ErrorCode1  hasResolution  "Run the (db2 UPDATE db cfg for <db2instancename> using LOGFILSIZ <new_value>)"

ErrorCode1  hasParent  Component1

UTILIZING LOG EVENT ONTOLOGY TO DELIVER USER ROLE SPECIFIC SOLUTIONS FOR PROBLEM DETERMINATION

BACKGROUND

The present invention relates to the field of problem determination and, more particularly, to utilizing log event ontology to deliver user role specific solutions for problem determination.

Many application server environments are typically comprised of a collection of distributed applications which can interact with each other and the environment numerous and complex ways. In these environments, when applications fail, problem determination data (e.g., error events) can be generated which can be used to debug the application failure during the problem determination process. One problem with utilizing debug determination data however is that the problem determination data generated by each application cannot be easily correlated. That is, each application's problem determination data can only provide a partial view of the overall failure.

In these application server environments, problem determination data can be typically recorded to application specific error logs. Frequently, these logs can exist in multiple locations and/or formats within the environment such as within application specific directories, vendor specific implementation formats, and specialized logging service locations. Further, error logs can comprise of logging information unrelated to error events including system diagnostic information, hardware information, etc. In many instances, system administrators are required to manually disregard irrelevant information during problem determination procedures. Consequently, the time cost attached to problem determination can increase considerably.

Additionally, many times event logs can be cryptic in that the logs can include little information about the error which occurred. In one instance, event logs can present error codes when an error event occurs, often times which are application specific. As a result, administrators are required to manually debug the error event utilizing a myriad of information sources (e.g., application error code manual, wikis, etc). Further, it is not uncommon for error events to generate multiple separate logging events in one or more locations. In this instance, a set of seemingly unrelated error messages can be linked to a single error event. In these scenarios, system administrators must perform complex auditing techniques to determine the cause of an error event. That is, administrators are forced to manually identify and evaluate relevant error information. These auditing techniques frequently lead to delayed problem determination results and administrator frustration.

BRIEF SUMMARY

The disclosure can be performed in accordance with numerous aspects or embodiments. One aspect is for a method, system, apparatus, and computer program product for analyzing log events. In the aspect, a log event can be received from a log source within an application server environment. The log event can be an error message which is associated with a log level. The application server environment can be a JAVA 2 ENTERPRISE EDITION runtime environment. The log event can be analyzed to determine the ontology of the log event which can comprise of the log event, the user context, and the relationship of the log event to the user context. The log event can be associated with the user context as determined by the relationship of the log event. Utilizing ontology information, user role specific solutions can be generated during a problem determination process.

Another aspect is for a method, system, apparatus, and computer program products that includes an ontology data model, an event analyzer, an ontology engine, and an inference engine. The ontology data model can include at least one log event, one user context, and a relationship between the at least one log event and the one user context. The event analyzer can analyze the at least one log event from a log source within an application server environment. In one embodiment, the application server environment can be a JAVA 2 ENTERPRISE EDITION runtime environment. The ontology engine can be able to construct and determine the ontology of the at least on log event from the ontology data model. The inference engine can generate inference results based on the ontology of the at least one log event.

One aspect of the invention if for a system, method, computer program product or apparatus that includes an interface for error provisioning. In the aspect display hardware can exist within which an interface window is displayed. A tangible memory can store at least one computer program product. A processor operable to execute the computer program product can cause the interface window to be displayed by the display hardware. A first portion of the interface window can be for specifying a log source, wherein the log source is at least one of a log file and an application component. A second portion of the interface window can be for assigning a user context to at least one of a set of error messages automatically determined based on user specified ontology criteria. The error messages can be selected from the log source.

DETAILED DESCRIPTION

The present disclosure provides a solution for utilizing semantics to deliver user role specific logging information. In the solution, error events from within an application server environment can be semantically analyzed to generate an ontology data model. The ontology data model can express relationships between an error event, a user context, an application, another error event, and the like. The data model can permit user role specific error logs to be generated during a problem determination process. That is, an error log and the error log content can be customized and delivered to users, groups, etc.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, for instance, via optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
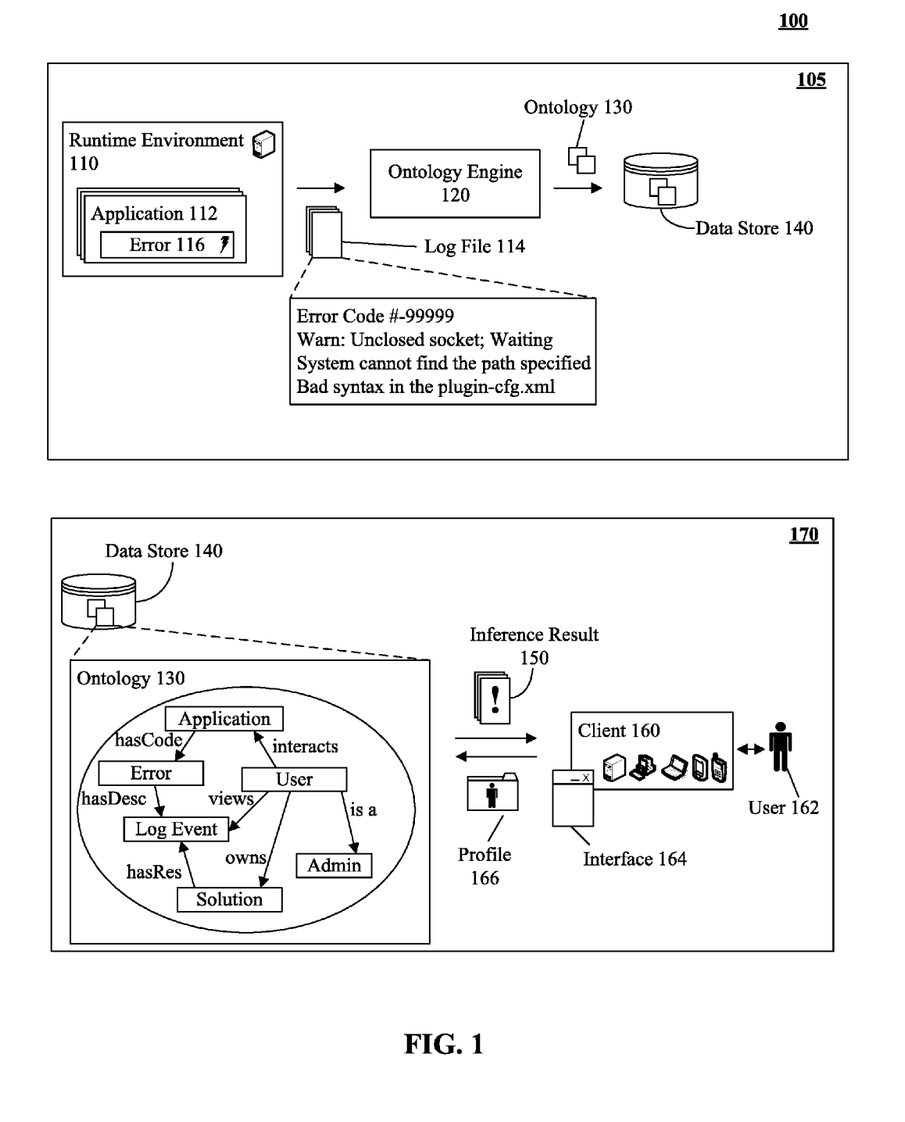
FIG. 1 is a schematic diagram illustrating a process flow for utilizing log event ontology to deliver user role specific solutions for problem determination in accordance with an embodiment of the inventive arrangements disclosed herein.

FIG. 1 is a schematic diagram illustrating a process flow 100 for a utilizing log event ontology to deliver user role specific solutions for problem determination in accordance with an embodiment of inventive arrangements disclosed herein. Process flow 100 can comprise of scenario 105, 170 which can permit dynamically generated problem determination artifacts (e.g., inference result 150) to be created in response to one or more application runtime events and/or user actions.

In scenario 105, an application error 116 can generate a log event which can be recorded within log file 114. Log file 114 can be automatically conveyed to ontology engine 120 which can process log file 114 to generate an ontology 130 of the log events. For instance, metadata obtained from error events (e.g., error messages) within log file 114 can be utilized to create ontology 130. The ontology 130 can determine relationships between elements (e.g., error 116) and the user context (e.g., user role) within process flow 100. For example, the ontology 130 can be used to establish the relationship between a user 162 and error 116. In scenario 170, ontology 130 can be utilized to produce inference result 150 which can be presented to user 162 via interface 164. Inference result 150 can be a customized solution based on user 162 role (e.g., user profile 166) within runtime 110.

It should be noted that the disclosure is distinctly different from traditional Common Base Event (CBE) approaches. In traditional CBE solutions, applications are required to be modified to support CBE based events. Further, CBE base events are not extensible and do not provide a mechanism to deliver log events based on content and/or user profiles.

As used herein, inference result 150 can be a user context based problem determination artifact comprising of, but not limited to, error 116, a portion of log file 114, ontology 130, inferred solution to error 116, confidence score, and the like. In one scenario, historical user 162 feedback can be used to improve inference result 150. In one embodiment, inference result 150 can be associated with a scaled user rating system which permits users to moderate the quality of inference result generated by ontology engine 120. In another embodiment, inference result 150 can be subject to a dualistic rating system (e.g., approve/disapprove). For instance, when a user approves an inference result 150, appropriate relationships within the ontology 130 can be reinforced permitting improved problem determination outcomes.

As used herein, runtime environment 110 can be an executable environment can be a hardware/software component able to run application 112. Runtime environment 110 can include, but is not limited to, software services as subroutines, libraries for common operations, implementation of programming language commands, type checking, debugging, code generation, code optimization, and the like. In one instance, runtime environment 110 can include a virtual machine, sandbox, and the like. For example, runtime environment 110 can be a JAVA 2 ENTERPRISE EDITION runtime environment.

Application 112 can be a software entity able to generate log file 114 in response to a error 116 event. Application 112 can include, but is not limited to, desktop software, server-side software, software services, middleware, enterprise software, and the like. For instance, application 112 can be an IBM DB2 software application. Application 112 can include one or more applications within a runtime environment, virtual machine, and the like. For instance, application 112 can be one of a set of instances of the same application.

Error 116 can be an application 112 occurrence which results in one or more error messages being generated within log file 114. Error 116 can include, but is not limited to, software bug, error flaw, mistake, failure, fault, and the like. Error 116 generated error messages can be recorded within log file 114 which can include error codes, error description, error id, application id, user associated with the error, and the like. It should be appreciated that error 116 can be a user presented message which can be documented within log file 114. In one embodiment, error 116 can comprise of an automatically generated error code which can be associated with an unresolved software issue. That is, error 116 can lack a problem resolution procedure, associated documentation, software fixes, and the like. For instance, error 116 can generate an error code #-99999 which can be an unknown problem within application 112.

Log file 114 can be a operating system entity permitting reading and/or writing of arbitrary error 116 information. Log file 114 can include, but is not limited to, text files, markup language files, and the like. Log file 114 can be in one or more traditional log formats including, Common Log Format (CLF), Extended Log Format (ELF), and the like. For example, log file 114 can be one or more an extensible markup language (XML) log file generated by application 112. Log file 114 can exist within one or more locations within runtime environment 110. It should be appreciated that log file 114 can include error messages, warning messages, diagnostic information, and the like.

Ontology engine 120 can be a hardware/software entity for establishing an ontology for an error 116 event. Engine 120 can process log file 114 to determine relevant error 116 event information and create a mapping for relevant relationships of error 116. Engine 120 can be configured to automatically process log file 114 in response to error 116 event. Engine 120 can determine user context utilizing log file 114 event information (e.g., username), log file 114 properties (e.g., owner), application properties, and the like. Engine 120 can create ontology 130 which can be stored within data store 140. In one instance, engine 120 can utilize artificial intelligence (AI) algorithms to create ontology 130, generate inference results 150, and the like.

Data store 140 can be one or more hardware/software components for temporarily and/or permanently storing ontology 130 information. Data store 140 can include, but is not limited to, volatile memory, non-volatile memory, and the like. In one embodiment, data store 140 can be a knowledge base repository configured to store ontology 130 information for runtime environment 110, application 112, and the like. Data store 140 can be a network area storage (NAS), storage area network (SAN), distributed storage element, and the like.

Ontology 130 can be a formal representation of runtime environment 110 knowledge by a set of entities within the runtime environment 110 domain and the relationships between those entities. The entities can include, but are not limited to, application 112, log file 114, error 116, inference result 150, user 162, and the like. For instance, ontology 130 can define a set of error messages and a user context for the messages, which can be used to identify an appropriate user for which messages can be conveyed. Ontology 130 can be created from one or more sources including, runtime environment 110, databases, and the like. Semantics for ontology 130 can be derived from log file 114 content, log file properties, application 112 settings, and the like. In one embodiment, ontology 130 can be derived from one or more data models including, but not limited to, entity-relationship diagrams, data flow diagrams, and the like. Ontology 130 can map relationships between entities within scenarios 105, 170 utilizing one or more description languages including, but not limited to, Web Ontology Language (OWL), Resource Description Framework (RDF), and the like. In one instance, ontology 130 can be associated with a symptom database which can be used to track application errors.

Inference result 150 can be a programmatically generated problem determination artifact enabling user 162 to diagnose error 116 based on user context. That is, result 150 can be dynamically tailored to user 162 based on user profile 166. Inference result 150 can be generated based on ontology 130 semantics, heuristics, and the like. Inference result 150 can be automatically generated and conveyed to client 160 which can be presented via interface 164 to user 162. Inference result 150 can include, but is not limited to, error 116 information, debugging information, problem resolution procedure, and the like. That is, inference result 150 can be used to diagnose and debug error 116 with minimal user effort. For instance, user 162 can receive solution information indicating the cause of the error code #-99999 (e.g., timeout failure due to a large data set) and a solution for repairing the error 116. In one embodiment, inference result 150 can be a knowledge base article dynamically generated based on user 162 role.

Client 160 can be a hardware/software entity able to receive inference result 150 from data store 140. Client 160 can include, but is not limited to, desktop computer, laptop, mobile phone, portable digital assistant (PDA), portable multimedia device, and the like. In one instance, inference result 150 can be automatically conveyed to client 160 in response to error 116. In another instance, inference result 150 can be communicated to client 160 in response to a manual user 162 interaction. Client can be associated with interface 164 which can be utilized by user 162 to interact with inference result 150. Inference result 150 can be directly utilized by user 162 to diagnose and/or evaluate error 116. For example, inference result 150 can present user 162 with an executable artifact (e.g., application patch) for remedying error 116.

User 162 can be a human agent associated with runtime environment 110. User 162 can include system administrators, database administrators, end-users, and the like. User 162 can be associated with a user profile 166 (e.g., user context) which can be defined within runtime 110, directory service, and the like. That is, user profile 166 can include user role, user permissions, objects a user can interact with, and the like. User profile 166 can be automatically communicated to ontology engine 120 during inference result 150 creation. In one embodiment, user profile 166 can be stored within ontology 130.

Interface 164 can be a user interface able to present one or more log events and/or inference results 150. Interface 164 can include, but is not limited to, graphical user interface (GUI), voice user interface (VUI), mixed-mode interface, and the like. Interface 164 can include a log viewer, problem determination tool, and the like. Interface 164 can permit inspection of log file 114 based on one or more arbitrary criteria, including, but not limited to, data/time, log level, user role, and the like. In one embodiment, user 162 can selectively generate inference result 150 when interaction with a log event occurs. In one instance, interface 164 can be an IBM LOG ANALYZER.

Drawings presented herein are for illustrative purposes only and should not be construed to limit the invention in any regard. It should be appreciated, scenario 105, 170 illustrate only one contemplated embodiment of the disclosure. In one instance, inference result 150 can be an aggregated list of log events and event solutions associated with a user role. For example, inference result 150 can indicate problems and solutions which have occurred during a specified period of time.

Figure 2:
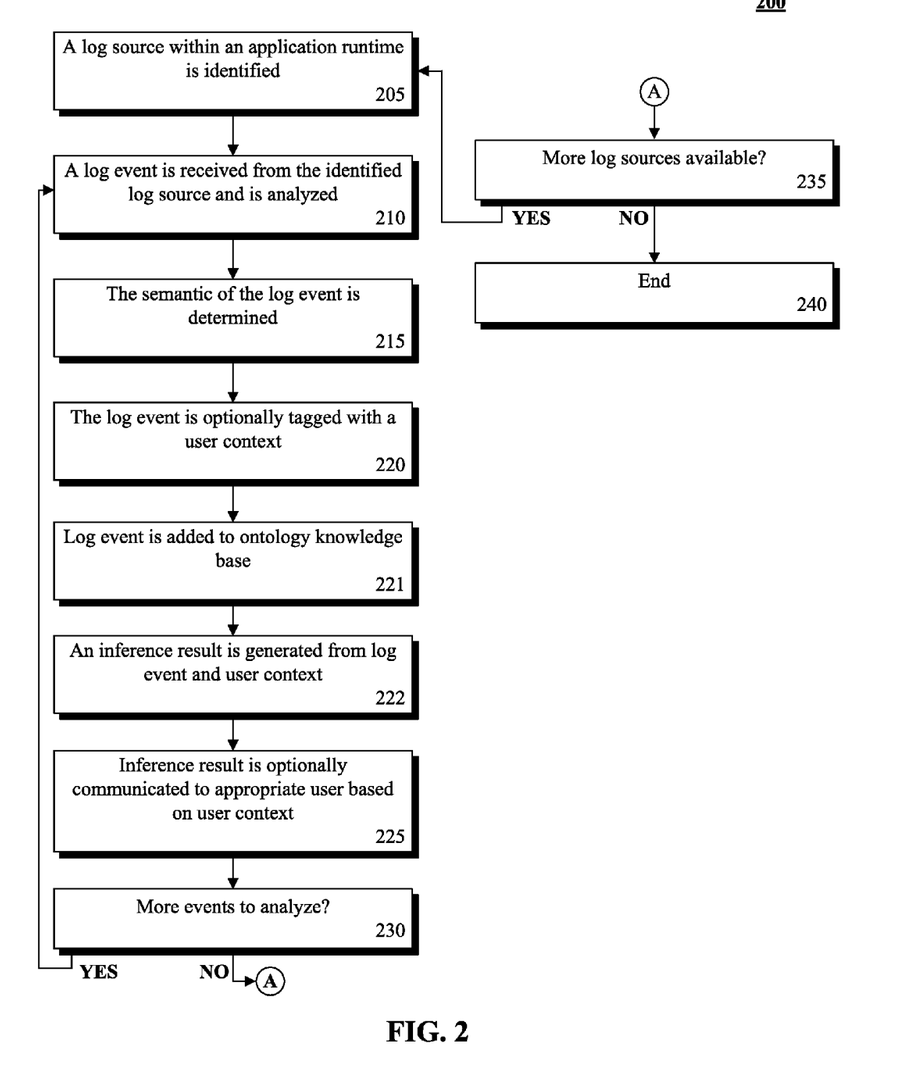
FIG. 2 is a schematic diagram illustrating a method for utilizing log event ontology to deliver user role specific solutions for problem determination in accordance with an embodiment of the inventive arrangements disclosed herein.

FIG. 2 is a flowchart illustrating a method 200 for utilizing semantics to deliver user role specific logging information in accordance with an embodiment of inventive arrangements disclosed herein. Method 200 can be performed in the context of process flow 100. In method 200, a log event can be analyzed to determine ontology of the event with relation to the user context. The ontology can be used to enhance an ontology knowledge base for improved problem determination solutions. In one instance, the ontology created from method 200 can be used with existing knowledge bases and/or expert systems.

In step 205, a log source within an application runtime can be identified. The log source can include, but is not limited to, an application, a system process, a logging engine, a logging server, and the like. In step 210, a log event can be received from the identified log source which can be analyzed. In step 215, the semantic of the log event can be determined. This determination can be performed utilizing automated and/or manual input parameters. In one embodiment, a Unified Modeling Language entity can be used to identify the semantic of a log event. In step 220, the log event can be optionally tagged with a user context. In one instance, keyword tags can be associated with each log event permitting relationships to be established readily. In step 221, the log event can be added to the ontology knowledge base. In step 222, an inference result can be generated from the log event and the user context.

In step 225, the log event can be optionally communicated to an appropriate user based on the user context. Communication to the appropriate user can be established within ontology settings, knowledge base settings, and the like. Communication can include, but is not limited to, electronic mail (e-mail), telephony, Short Message Service (SMS), Instant Message (IM), and the like. In step 230, if there are more events to analyze the method can proceed to step 210, else continue to step 235. In step 235, if there are more log sources available, the method can proceed to step 205, else continue to step 240. In step 240, the method can end.

Drawings presented herein are for illustrative purposes only and should not be construed to limit the invention in any regard. Method 200 can be performed continuously within an runtime environment providing real-time problem determination knowledge. It should be appreciated method 200 can vary with implementation as necessitated by logging infrastructures. Further, method 200 can be performed within existing logging infrastructures without requiring logging procedures to be modified. It should be noted, method 200 is not limited to application logging and can be extended to system level logging events.

Figure 3:
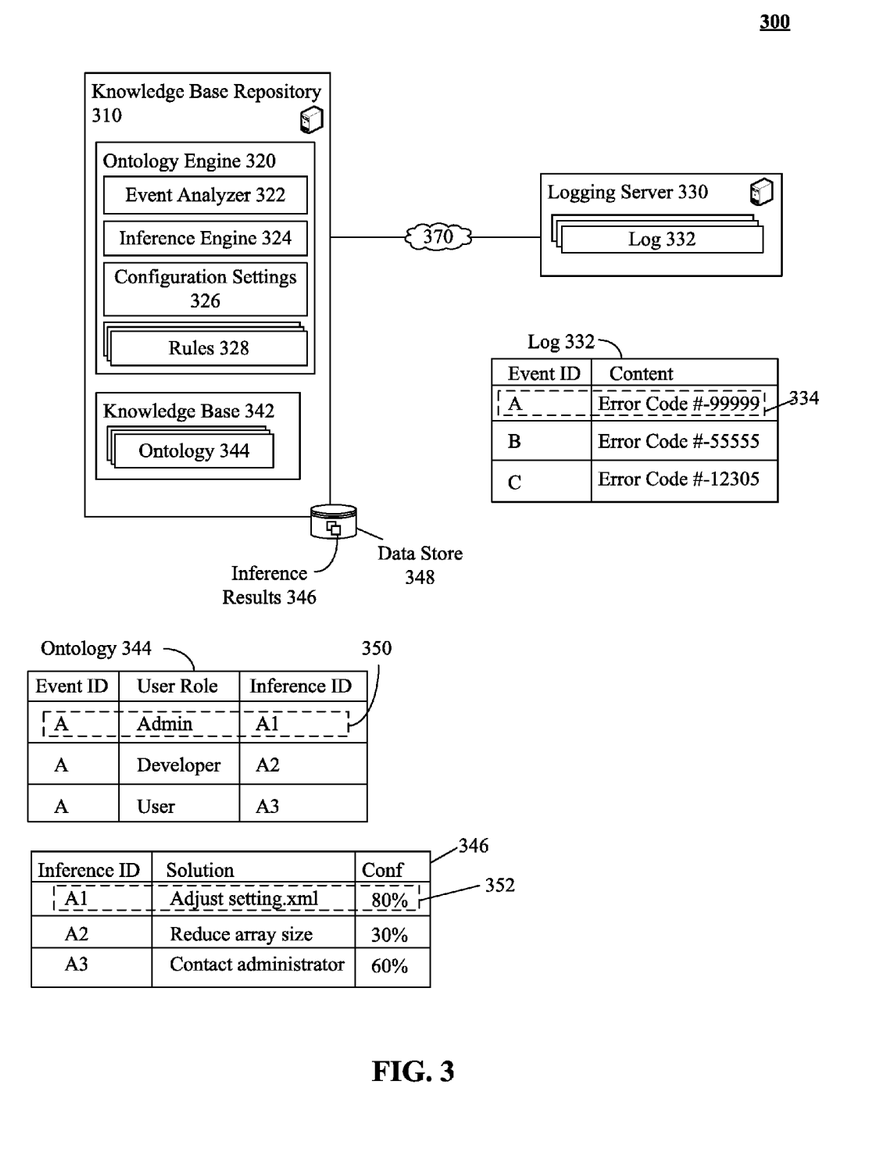
FIG. 3 is a schematic diagram illustrating a system for utilizing log event ontology to deliver user role specific solutions for problem determination in accordance with an embodiment of the inventive arrangements disclosed herein.

FIG. 3 is a schematic diagram illustrating a system for utilizing semantics to deliver user role specific logging information in accordance with an embodiment of inventive arrangements disclosed herein. System 300 can be present within the context of process 100 and method 200. In system 300, an ontology engine 320 can provide user role specific solutions for a event (e.g., error event 334) stored within log 332 occurring within a runtime environment (e.g., runtime environment 110). Utilizing rules 328, ontology engine 320 can generate inference results 346 which can be used to dynamically present role based solutions during a problem determination process. For instance, utilizing ontology information 350, an administrator specific solution 352 (e.g., editing a server configuration file) can be presented when an administrator is performing a problem determination process.

It should be appreciated that system 300 is one contemplated configuration for providing user contextual problem determination solutions. In system 300, log 332 can be associated with a logging server 330 which can be part of a distributed logging environment. For instance, logging server 330 can be one or more vendor maintained computing resources remotely linked to repository 310.

Knowledge base repository 310 can be a collection of data representing an event and/or one or more inferred user contextual solutions to the event. Repository 310 can include, but is not limited to, ontology engine 320, knowledge base 342, data store 348, and the like. Repository 310 can include hardware, but is not limited to, volatile memory, non-volatile memory, a processor, a bus, and the like. Repository 310 can be communicatively linked to logging server 330 via network 370. Repository 310 can be a component of a knowledge management system, expert system, and the like. In one embodiment, repository 310 can be an IBM COGNOS software.

Ontology engine 320 can be a component of knowledge base repository 310, a network element, a distributed component of a knowledge management system and the like. Ontology engine 320 can include, but is not limited to, event analyzer 322, inference engine 324, configuration settings 326, and the like. In one embodiment, engine 320 components can be configured to execute during periods of inactivity and/or low computing resource usage. In another embodiment, engine 320 can continually poll log 332 to determine a events which require solutions.

Event analyzer 322 can be a hardware/software component for determining user context of an event within log 332. User context can be obtained by analyzer 322 from one or more sources including, but not limited to, log content 332, log 332 properties, and the like. Analyzer 322 can be configured via configuration settings 326 to process log 332 regardless of format. In one embodiment, analyzer 322 can utilize existing ontology 344 information to determine user context for an event. In another embodiment, analyzer 322 can employ inference results 346 to establish user context for an event. Once a user context is established, analyzer 346 can convey user context information to inference engine 324. In one instance, analyzer 322 can be invoked via a user initiated event correlation analysis functionality.

Inference engine 324 can be a hardware/software component for determining user context specific inference results 346 for one or more events occurring within an application runtime. Inference engine 324 functionality can include, but is not limited to, interpretation, consistency enforcement, and the like. Engine 324 can utilize one or more traditional and/or proprietary algorithms for determining inference results 346. For example, inference engine can utilize a Rete algorithm to establish potential solutions for error 334. In one embodiment, engine 324 can include inductive inference for determining results 346.

In one instance, engine 324 can generate a confidence score which can be associated with an inference result 352. In the embodiment, the confidence score can indicate the likelihood the inference result is an accurate solution for a user role.

Configuration settings 326 can be one or more parameters for determining the behavior of ontology engine 320. Settings 326 can be used to control event analysis based on the log level of the event. For example, in resource intensive environments, events which are associated with a "critical" log level can be processed enabling non-critical errors to be handled manually. Utilizing settings 326, application specific settings can be established, enabling trivial applications and associated errors to be safely ignored. Settings 326 can enable auditing processes to be enacted including, but not limited to, rule tracing, inference inspection, stack tracing, and the like.

Rules 328 can be one or more inference rules for generating inference results 346 in response to event occurrence. Rules 328 can be selectively executed based on ontology 344 analysis. Rules 328 can be automatically and/or manually established. In one instance, rules 328 can conform to a predicate logic format. In one embodiment, rules 328 can be heuristically generated from historical data, ontology 344 data, and the like. In one instance, rules 328 can produce one or more conclusions (e.g., inference results) from ontology 344 utilizing traditional rules and/or proprietary rules.

Drawings presented herein are for illustrative purposes only and should not be construed to limit the invention in any regard. In one embodiment, ontology engine 320 functionality can be encapsulated within an application programming interface (API). For example, ontology engine 320 capabilities can be a component of an IBM Integrated Ontology Development Toolkit. In one instance, ontology 344 can conform to symptom database formats including Symptom version 2.0, Symptom version 0.1, and the like. It should be appreciated that system 300 is tractable through user feedback mechanisms, automated feedback mechanisms, and the like.

Figure 4:
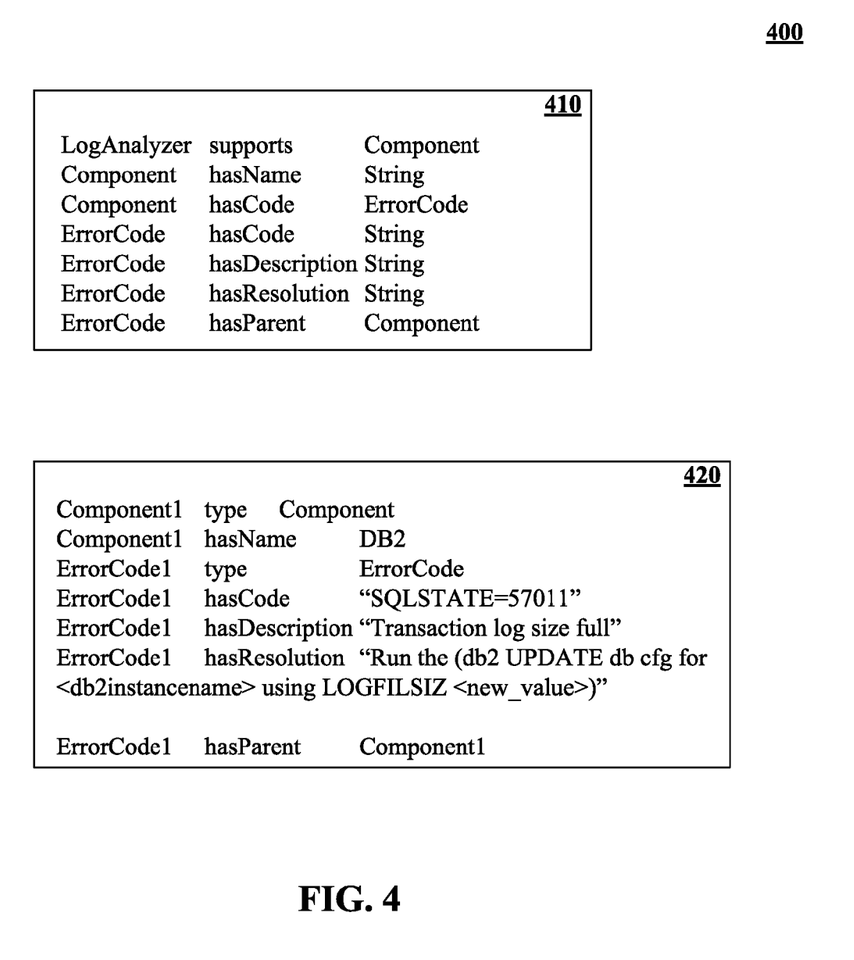
FIG. 4 is a schematic diagram illustrating an example definition and instance for utilizing log event ontology to deliver user role specific solutions for problem determination in accordance with an embodiment of inventive arrangements disclosed herein.

FIG. 4 is a schematic diagram illustrating an example definition 410 and instance 420 for utilizing log event ontology to deliver user role specific solutions for problem determination in accordance with an embodiment of inventive arrangements disclosed herein. Definition 410 can be associated with system 300 enabling product integration with multiple vendors and/or products using an ontology knowledge base. That is, definition 410 can be similar to a schema and type definition for organizing metadata from vendor products. For instance, definition 410 can be utilized by an ontology knowledge base to classify error metadata from an IBM DB2 vendor software.

The definition 410 can define classifications for an ontology knowledge base which can be user manipulated. In one instance, definition 410 can specify a formal definition for error events associated with an IBM LOG ANALYZER. In the instance, error events can be associated with a component, error codes, description, resolution, parent, and the like. In one embodiment, definition 410 can be utilized as a template during an import and/or migration process for a symptom database.

In instance 420, information provided by a vendor can be correlated to the definition 410. In this manner, users can extend an ontology knowledge base utilizing vendor provided information, enabling the ontology knowledge base to remain current and flexible. In one embodiment, information associated with instance 420 can be user manipulated via an interface (e.g., interface 510). For instance, an administrator can customize vendor provided data (e.g., resolution information) to enable user appropriate resolution information to be disseminated.

Drawings presented herein are for illustrative purposes only and should not be construed to limit the invention in any regard. It should be noted definition 410 and instance 420 is only one contemplated embodiment for organizing error metadata and user context.

Figure 5:
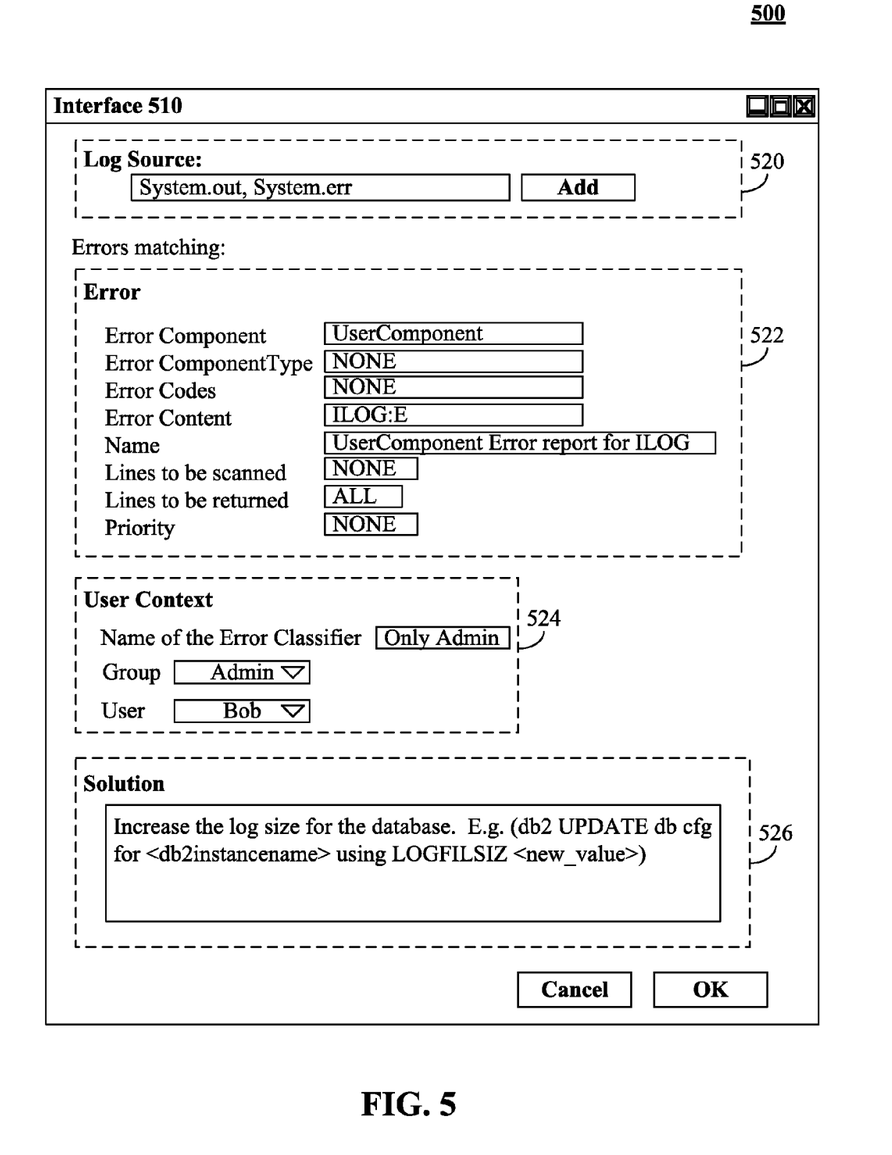
FIG. 5 is a schematic diagram illustrating an interface for utilizing log event ontology to deliver user role specific solutions for problem determination in accordance with an embodiment of inventive arrangements disclosed herein.

FIG. 5 is a schematic diagram illustrating an interface 510 for utilizing log event ontology to deliver user role specific solutions for problem determination in accordance with an embodiment of inventive arrangements disclosed herein. In interface 510, selection of log source and error provisioning can be performed via interface elements presented within sections 520-526. Sections 520-526 can be automatically and/or manually populated based on configuration parameters associated with interface 510. In one instance, interface 510 can be associated with an IBM ECLIPLSE software.

In section 520, the log source for error provisioning can be identified. The log source can include one or more system logs, application logs, application server components, and the like. For example, JAVA VIRTUAL MACHINE (JVM) logs can be chosen by an administrator for selective error provisioning. In one embodiment, existing logging level supported by various components of an application server can be integrated into interface 510. For instance, a link can be presented at each component to provision the log event to user roles based on the content of error messages and/or error codes.

In section 522, user customizable error parameters can be specified which can be assigned to a user context. Section 522 can present one or more portions of metadata corresponding to a definition (e.g., definition 410). For instance, section 522 can permit user specification of component, component type, error code, error content, error name, priority, and the like. In one instance, metadata associated with component, component type and error codes can be automatically populated from an ontology knowledge base. Error events matching metadata defined within section 522 can be assigned to a user context utilizing section 524.

In section 524, user context can be established utilizing interface elements within section 524. Section 524 can permit arbitrarily complex user context associations to be applied to error events. In one embodiment, an error classifier can be used to create groupings which can be used to easily manage user context. For instance, a grouping can be created which assigns administrator user context to an error event without requiring manual user selection of one or more administrators. In another embodiment, specific groups and users can be assigned to the user context of an error event utilizing interface elements within section 524.

In section 526, a resolution action can be specified for the provisioned error within interface 510. The resolution action can be automatically populated from one or more sources including an ontology knowledge base, symptom database, and the like. Based on the user context selection within section 524, the appropriate resolution action can be presented. That is, multiple resolution actions can be associated with an error event based on selected user context within section 524. In one embodiment, section 526 can present the resolution action within a text field enabling user modification of the resolution action. Changes to the resolution action can be automatically propagated to the appropriate source.

Drawings presented herein are for illustrative purposes only and should not be construed to limit the invention in any regard. Interface 510 can include, but is not limited to, a graphical user interface (GUI), voice user interface (VUI), mixed-mode interface, text interface, and the like. Interface 510 can include interface artifacts including, but not limited to, drop down boxes, radio buttons, checkboxes, text fields, text areas, and the like. Functionality associated within interface 510 can be presented within a file menu, context menu, and the like.

The flowchart and block diagrams in the FIGS. 1-5 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for analyzing log events comprising:
   receiving a log event from a log source within an application server environment, wherein the log event is an error message, wherein the log event is associated with a log level;
   analyzing the log event to determine the ontology of the log event, wherein the ontology of the log event comprises of at least one log event, a user context, and the relationship of the at least one log event to the user context;
   associating the log event with the user context as determined by the relationship of the log event;
   inferring a solution for an error associated with the at least one log event utilizing semantics of the at least one log event, the log level, and the related log event; and
   presenting the solution to a user based on a user role, wherein the solution is user role specific.

2. The method of claim 1, wherein the receiving, analyzing, and associating is performed in real-time from the log source.

3. The method of claim 1, further comprising: presenting a related log event based on a specified user context when the at least one log event is selected, wherein the related log event is semantically linked to the at least one log event.

4. The method of claim 3, wherein the specified user context is at least one of automatically determined based on authentication credentials.

5. The method of claim 1, wherein the solution is automatically incorporated to an ontology base knowledge base, wherein the knowledge base is an informational format conforming to at least one of a frequently asked question (FAQ), a how-to, a tutorial, a Wiki, and a flowchart.

6. The method of claim 1, further comprising: presenting content associated with an ontology based knowledge base, wherein the content comprises of the at least a log event, a solution procedure, and a Uniform Resource Locator identifying related content.

7. The method of claim 1, wherein the user context is determined semantically by at least one of a log source and a portion of the log content.

8. The method of claim 1, wherein the associating utilizes at least one of a Resource Description Framework (RDF) and a Extensible Markup Language.

9. A system for analyzing log events comprising:
   one or more processors;
   one or more memories storing program instructions, said program instructions executing on at least one of the one or more processors;
   a ontology data model, stored in at least one of the one or more memories, comprising of at least one log event, one user context, and a relationship between the at least one log event and the one user context;
   an event analyzer, comprising at least a subset of the program instructions, configured to analyze the at least one log event from a log source within an application server environment;
   an ontology engine, comprising at least a subset of the program instructions, able to construct and determine the ontology of the at least on log event, from the ontology data model; and
   an inference engine, comprising at least a subset of the program instructions, configured to generate inference results based on the ontology of the at least one log event, wherein the inference results of the inference represent an inferred solution for an error associated with the at least one log event, wherein the inferred solution is provided in real-time responsive to an occurrence of the at least one log event, and wherein the inference engine generates different solutions for the same log event dependent upon a user role of a system user, each of the different solutions representing a user role specific solution.

10. The system of claim 9, wherein the at least one log event comprises of Semantic Hypertext Markup Language (HTML) markup.

11. The system of claim 9, wherein the log source is a remotely communicative application logging server.

12. The system of claim 9, wherein the event analyzer presents a log record comprising of the at least one log event and a plurality of related log events, wherein the plurality of related log events is semantically determined from the ontology data model.

13. The system of claim 9, wherein the inference results are conveyed to an ontology repository.

14. The system of claim 9, further comprising: mapping a log level associated with a log event to the at least one log event within the ontology data model.

15. The system of claim 9, further comprising: a filter permitting a plurality of event logs to be presented responsive to at least one of a username and a user role selection.

16. The system of claim 9, wherein the application server environment is a JAVA 2 ENTERPRISE EDITION runtime environment.

17. A computer program product comprising:
   a non-transitory computer usable storage medium storing computer usable program code executable by one or more processors, the computer usable program code comprising:
   computer usable program code configured to receive a log event from a log source within an application server environment, wherein the log event is an error message, wherein the log event is associated with a log level;

computer usable program code configured to analyze the log event to determine the ontology of the log event, wherein the ontology of the log event comprises of at least one log event, a user context, and the relationship of the at least one log event to the user context;

computer usable program code configured to associate the log event with the user context as determined by the relationship of the log event;

computer usable program code configured to infer a solution for an error associated with the at least one log event utilizing semantics of the at least one log event, the log level, and the related log event; and computer usable program code configured to present the solution to a user based on a user role, wherein the solution is user role specific.

18. The computer program product of claim 17, wherein the solution is automatically incorporated to an ontology base knowledge base, wherein the knowledge base is an informational format conforming to at least one of a frequently asked question (FAQ), a how-to, a tutorial, a Wiki, and a flowchart.

19. The computer program product of claim 17, wherein the associating utilizes at least one of a Resource Description Framework (RDF) and an Extensible Markup Language.

20. The computer program product of claim 17, further comprising:

computer usable program code configured to present content associated with an ontology based knowledge base, wherein the content comprises of the at least a log event, a solution procedure, and a Uniform Resource Locator identifying related content.

\* \* \* \* \*